April 5, 1966 D. A. KOHL 3,245,078
SELECTIVE SELF-ADJUSTABLE PULSE COUNTER
Filed May 6, 1963
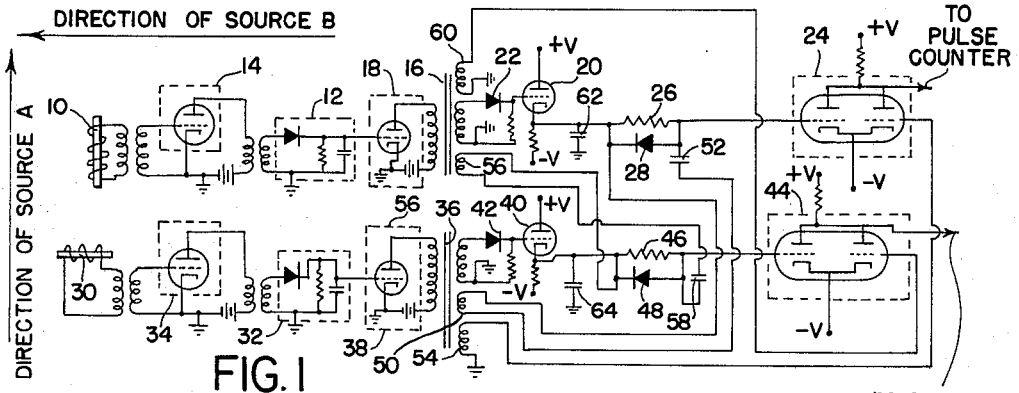
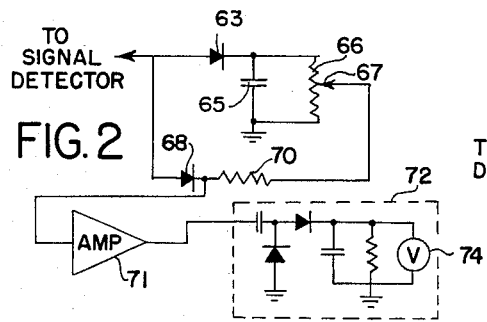
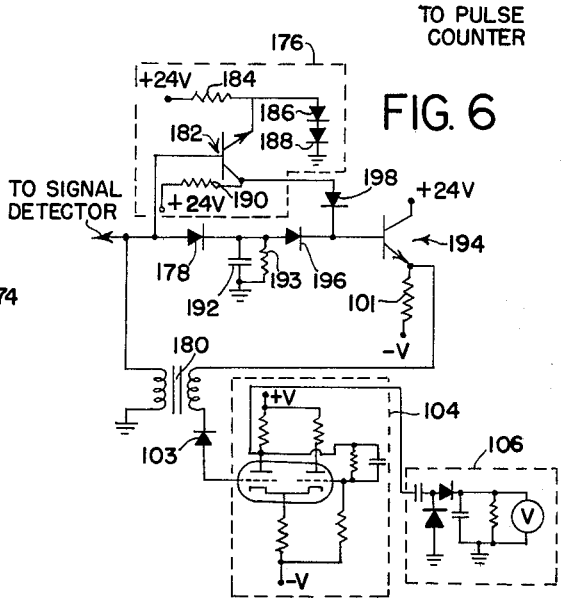
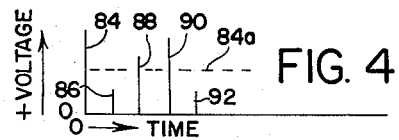
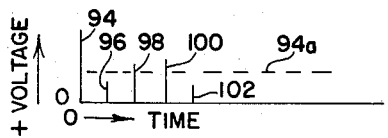
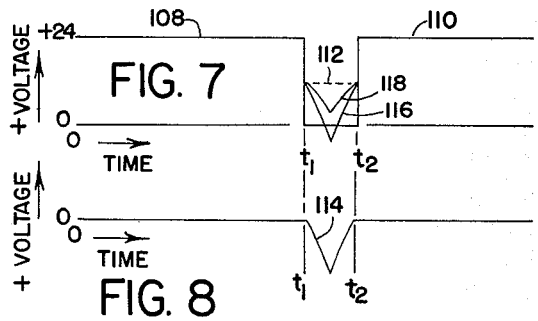
INVENTOR.
DOUGLAS A. KOHL
BY Kenneth D. Ohm
ATTORNEY 3,245,078
SELECTIVE SELF-ADJUSTABLE PULSE COUNTER
Douglas A. Kohl, Osseo, Minn., assignor, by mesne assignments, to Litton Systems, Inc., Beverly Hills, Calif., a corporation of Maryland
Filed May 6, 1963, Ser. No. 278,247
11 Claims. (Cl. 343—112)

The present invention relates to improvements in pulse counters. More particularly, it pertains to a selective pulse counter having a self-adjustable window count rate threshold.

It has been found that each different cumulo-nimbus type of weather condition provides electromagnetic signals which has a characteristic amplitude distribution pattern. That is, weather conditions such as thunderstorms, tornados, cyclones, etc. each provide an electromagnetic signal spectrum having a different amplitude distribution. Changes in these amplitude distribution patterns occur due to changing storm conditions. The strength of the various electromagnetic signals forming these amplitude distributions received by a given detector vary depending upon the distance said detector is positioned from the storm. This attenuation of the electromagnetic signals due to distance has been found to be the source of some problems when attempting to locate a particular storm by means of triangulation when the detectors are located at different distances from said storm.

In particular, it is well known that the triangulation method can be used to find a position by means of taking bearings with reference to two fixed locations which are a known distance apart, so that the value of one side and all the angles of a triangle become known. From this data, the position can be computed.

Thus, when attempting to find the position of a storm using the triangulation method, a detector is placed at each of two locations which are a known distance apart. The detectors are then used to take bearings of a storm wherein the bearings relate the electromagnetic signals detected to a given detection angle. Because the strength of the electromagnetic signal varies with the distance between the detector and the storm producing such signals, problems have arisen when the storm is located at different distances from the two prior art detectors.

Accordingly, one object of this invention is to provide a pulse counter for counting the number of electromagnetic signals greater than a predetermined magnitude received from a given source in which such count is not affected by the distance said counter is from the source.

Another object of this invention is to provide a pulse counter for counting the number of electromagnetic signals that are greater than a predetermined amount which counter measures the average peak amplitude of signals representative of said electromagnetic signals and sets a window count rate threshold which is directly proportional to said average peak amplitude.

A further object of this invention is to provide a selective self-adjustable pulse counter which is free from amplifier changes for counting the number of pulses per unit time which are received from an electromagnetic source and which are greater than a predetermined magnitude.

Other objects and advantages of this invention will be apparent from the following description in which certain preferred embodiments of the invention are disclosed. In the drawings which form a part of this application:

FIGURE 1 is an electrical circuit diagram of apparatus capable of providing signals indicative of the amplitude distribution of various weather conditions;

FIG. 2 is an electrical circuit diagram of a system constructed according to the present invention;

FIGS. 3, 4, and 5 are graphs illustrating, in part, the operation of the system of FIG. 2;

FIG. 6 is an electrical circuit diagram of a more complex system constructed according to the present invention;

FIGS. 7 and 8 are graphs illustrating, in part, the operation of the system of FIG. 6.

Referring now more particularly to FIGURE 1, a directional pickup coil 10 mounted with its axis in the horizontal plane provides an input to a detector 12 through an amplifier 14. The detector 12 provides an input to the primary of a transformer 16 through a pulse amplifier 18. A cathode follower 20 is connected to the secondary of the transformer 16 through a diode 22. A gate 24 is connected to the cathode of the cathode follower 20 through a resistor 26. A diode 28 is connected in parallel with the resistor 26. The output of the gate 24 provides the input to the selective pulse counter of the present invention. This output contains a series of signals having an amplitude distribution representative of the amplitude distribution of the electromagnetic source A positioned as indicated in FIG. 1.

A directional pickup coil 30 mounted with its axis in the horizontal plane and having its plane of reception perpendicular to the plane of reception of pickup coil 10 provides the input to a detector 32 through an amplifier 34. The detector 32 provides the input to the primary coil of a transformer 36 through a pulse amplifier 38. A cathode follower 40 is connected to the secondary of the transformer 36 through a diode 42. A gate 44 is connected to the cathode of the cathode follower 40 through a resistor 46. A diode 48 is connected in parallel with the resistor 46. The output of the gate 44 provides the input to the selective pulse counter of the present invention. This output contains a series of signals having an amplitude distribution representative of the amplitude distribution of the electromagnetic source B positioned as indicated in FIG. 1.

The parallel connected resistor 26 and diode 28 are linked to a secondary coil 50 of the transformer 36 through a capacitor 52. Another secondary coil 54 of the transformer 36 provides a second input to the gate 24. The parallel connection of the resistor 46 and the diode 48 are connected to a secondary coil 56 of the transformer 16 through a capacitor 58. Another secondary coil 60 of the transformer 16 provides a second voltage input to the gate 44.

When the pickup coils 10 and 30 are so disposed that the plane of reception of the coil 30 is parallel to the vector pointing in the direction of the electromagnetic signal source A as indicated in FIG. 1, maximum voltage signals representative of the amplitude distribution of this source of interest are supplied to the primary of the transformer 36 and minimum voltage is supplied to the primary of the transformer 16. The secondary coil 50 of the transformer 36 provides, through its associated circuit, a series of signals across the resistor 26 proportional to the series of signals received by the pickup coil 30 but delayed slightly until after each such signal impulse has reached its maximum instant. At any given instant as long as the signal from the cathode follower 20, i.e., the signal representative of the signal picked up by the coil 10, is less than the signal then appearing across the resistor 26, then the signals being impressed upon the secondary coil 54 of the transformer 36 will be passed through the gate 24 to the pulse counter connected to said gate 24. If, on the other hand, at any given instant the signal at the cathode of the cathode follower 20 is greater than the signal then appearing across the resistor 26, the gate 24 would not be enabled and would not let the signal then impressed upon the secondary coil 54 pass to the pulse counter.

A capacitor 62 and a capacitor 64 in the cathode follower circuit 20 and 40, respectively, act to prolong the pulses occurring at said cathode so that the delayed pulse voltage which can occur across resistor 26 and resistor 46, respectively, will be added to the substantially correct value of the peak cathode follower voltages of tube 20 and 40, respectively.

If the electromagnetic signal source originates in the direction of source B, as shown in FIG. 1, then it is obvious that the functioning of the circuits will be reversed with detection coil 30 receiving substantially zero signal and the detection coil 10 receiving maximum voltage signals representative of the amplitude distribution of this source B. These signals would provide through their associated circuits a series of proportional signals to occur at the pulse counter connected to the gate 44.

Other specific systems that can be used for providing the input to the pulse counters of the present invention are disclosed in a copending application entitled Direction Finder, Serial No. 273,677, filed April 17, 1963, of which Douglas A. Kohl is the applicant.

Referring now more particularly to FIG. 2, a diode 63 adapted for connection to a gate like 24 or 44 of FIG. 1 provides the input to a capacitor 65 connected in parallel with a resistor 66. Also adapted for connection to a gate like 24 or 44 of FIG. 1 is a diode 68 in series with a resistor 70. The resistor 70 is connected to the resistor 66 by means of an adjustable connector 67. The junction between the diode 68 and the resistor 70 is connected to the input of a count rate circuit 72 through an amplier 71. The count rate circuit 72 includes a voltmeter 74.

When the pulse counter shown in FIG. 2 receives a series of signals from either a gate like 24 or a gate like 44, said series of signals are simultaneously impressed upon the diodes 63 and 68. If, when each of said signals of said series occurs, it is greater than the charge then on the capacitor, it will raise the charge on the capacitor 65 which in turn will raise the voltage appearing across the resistor 66. Because the time constant of the resistor 66 and the capacitor 65 is quite long, e.g. 10 minutes, the voltage appearing across the resistor 66 will be a measure of the average peak amplitudes of said series signals. This may be more readily understood by use of FIG. 3 which graphically illustrates the amplitude distribution of the output of a gate like 24 or 44 being fed to the system of FIG. 2 which output is based on a particular storm being detected by the direction finder illustrated in FIG. 1. As can be seen, this particular storm has an amplitude distribution consisting of a series of electromagnetic signals. Four of these signals 76, 78, 80, and 82 have magnitudes greater than the other electromagnetic signals created by said storm.

The first of these signals 76 charges the capacitor 64. Due to the long time constant relationship between the capacitor 64 and the resistor 66, the capacitor voltage equal to and caused by the signal 76 remains across the resistor for a long time, for example 10 minutes. The average peak voltage appearing across the resistor 66 due to the signal 76 is depicted by the dotted line 76b. Therefore, when the smaller signals represented by the short lines 77 and 79 occur they do not cause any change in the voltage appearing across the resistor 66. When a signal which is greater in magnitude than the voltage of signal 76, such as signal 78, is impressed upon the capacitor 64, the voltage across the resistor 66 is raised to correspond to the capacitor voltage equal to and caused by the signal 78. The average peak voltage appearing across the resistor 66 due to the signal 78 is depicted by the dotted line 78b. When the signal 80 is impressed upon the diode 62 the voltage of the capacitor 64 is again raised and thus the voltage appearing across the resistor 66 is also raised to equal that of the signal 80. The average peak voltage appearing across the resistor 66 due to the signal 80 is depicted by the dotted line 80b. The voltages 76b, 78b and 80b appearing across the resistor 66 due to the signals 76, 78, and 80 respectively, are representative of the average peak amplitudes of the electromagnetic signals which caused signals 76, 78, and 80 to appear at the output of the gate 24 because of the long time constant of resistor 66 and capacitor 64 providing a statistically valid measure of the amplitude distribution maximum. The voltages 76a, 78a, and 80a appearing between the adjustable contact 67 and ground are a predetermined portion K of the average peak voltages 76b, 78b, and 80b, respectively. The adjustable contact 67 is positioned on the resistor 66 and the diode 68 and the resistor 70 are selected so that unless the magnitude of an input signal to the pulse counter is greater than K times the average peak voltage Ê, such as 76b, 78b, and 80b, then appearing across the resistor 66, there will be no input to the count rate circuit 72 through the amplifier 71 which can be counted. Thus, it will be seen that the window count rate threshold KÊ of the count rate circuit is self-adjustable. Whenever the input to the count rate circuit of FIG. 2 exceeds this average peak voltage KÊ, then a signal is impressed upon the count rate 72 and it is counted. This condition is illustrated by signal 82 which exceeds the average peak voltage 80a.

FIGS. 4 and 5 illustrate graphically the inputs to selective pulse counters as shown in FIG. 2 which are located at different distances from a particular storm. The pulse counter receiving the signals illustrated in FIG. 4 is closer to the storm than the pulse counter receiving the signals illustrated in FIG. 5. Numerals 84 and 94, 86 and 96, 88 and 98, 90 and 100, and 92 and 102 represent corresponding electromagnetic signals provided by the storm of interest. Since the pulse counter receiving the signals illustrated in FIG. 5 is a greater distance from the storm, each of the signals received thereby are smaller in magnitude than each of the corresponding signals received by the pulse counter receiving the signals illustrated by FIG. 4.

The voltages depicted by numerals 84, 86, 88, 90, and 92 of FIG. 4, and the voltages depicted by numerals 94, 96, 98, 100, and 102 of FIG. 5 represent the amplitude distribution of the storm of interest. On the pulse counter receiving the signals illustrated by FIG. 4 the signal depicted by numeral 84 establishes a voltage $\hat{E}_4$ across the resistor 66 of FIG. 2. Because of the long time constant, dotted line 84a is representative of a predetermined portion of the average peak voltage $K\hat{E}_4$ established across the resistor 66. This peak voltage only permits an input to the count rate circuit 72 for signals 88 and 90. On the pulse counter receiving the signals illustrated by FIG. 5, the signal depicted by numeral 94 establishes a voltage $\hat{E}_5$ across the resistor 66. Because of the long time constant, dotted line 94a is representative of a predetermined portion of the average peak voltage, $K\hat{E}_5$, established across the resistor 66. This average peak value permits only inputs to a count rate circuit like 72 for signals 98 and 100. Thus, it will be seen that pulse counters like that shown in FIG. 2 count identical signals and will provide count rates for a given storm which are indicative of the number of electromagnetic signals provided by such storm which are larger than a predetermined magnitude. Since this predetermined magnitude is solely dependent upon the average peak of the amplitude distribution of the storm being received by the detector associated with the pulse counter, the pulse counter will provide an indication of all electromagnetic signals in the amplitude spectrum of the storm which are greater than a predetermined magnitude which indication is not affected by the distance between said storm and said detector. That is, for the same storm, two or more pulse counters in a triangulation network, will provide identical counting rates at the several counters.

Referring now to FIG. 6, a connector means adapted for connection to a gate like gate 24 or 44 of FIG. 1 simultaneously provides the input to an unclamper circuit 176, a diode 178, and the primary coil of a transformer 180. The input to the unclamper circuit 176 is connected to the base of a transistor 182. The emitter of the transistor 182 is connected to a positive voltage source of 24 volts through a resistor 184. The junction between the emitter of the transistor 182 and the resistor 184 is connected to ground through diodes 186 and 188 connected in series. The collector of the transistor 182 is connected to a positive voltage source of 24 volts through a resistor 190.

The previously mentioned diode 178 is connected to ground through a capacitor 192 connected in parallel with a resistor 193. The junction between the diode 178 and the capacitor 192 is connected to the base of a transistor 194 through a diode 196. Another diode 198 is connected between the base of the transistor 194 and the collector of the transistor 182. The collector of the transistor 194 is connected to a positive voltage source of 24 volts while the emitter is connected through a resistor 101 to a negative voltage. The junction between the emitter of the transistor 194 and the resistor 101 is connected to one terminal of the secondary of the transformer 180. The other terminal of the secondary of the transformer 180 is connected to the input of a pulser circuit 104 through a diode 103. The output of the pulser circuit 104 provides the input to a count rate circuit 106.

When the pickup coils 10 and 30 are disposed as shown in FIG. 1 with the plane of reception of the coil 30 parallel to the vector pointing in the direction of the electromagnetic signal source A as indicated in the drawings, maximum voltage signals representative of the amplitude distribution of the electromagnetic signals of the source A are supplied to the gate 24. When the pickup coils 10 and 30 are disposed as shown in FIG. 1 with the plane of reception of the coil 10 parallel to the vector pointing in the direction of the electromagnetic signal source B as indicated in the drawings, maximum voltage signals representative of the amplitude distribution of the electromagnetic signals of the source B are supplied to the gate 44. Each signal of such series of representative signals supplied to the pulse counter like that of FIG. 6 causes a voltage representative thereof across the capacitor 192. Due to the long time constant relationship between the capacitor 192 and the resistor 193, the capacitor voltage equal to and caused by various of such representative voltage remains across the resistor 193 for a long time in the same manner as explained for the capacitor 65 and the resistor 66 of FIG. 2. At the same time each such signal is fed to the capacitor 192 it is also fed to the base of the transistor 182 of the unclamper circuit 176 and to the primary coil of the transformer 180.

Normally the base of the transistor 182 is at zero. As is well known in the art, diodes 186 and 188 then cut the transistor 182 off. Therefore, the collector of the transistor 182 will be at 24 volts. As is well known in the art, each such signal of the series of signals fed to the pulse counter having a positive magnitude will cause the transistor 194 to perform its unclamp function and thereby permits the peak voltage of such signal to appear across the capacitor 192 to be let out by the transistor 194. That is, the transistor 194 provides a voltage across the resistor 101 for each signal of the series of signals fed to the pulse counter which is representative of the voltage on the capacitor 192 caused by each such signal. The voltage thus provided across the resistor 101 causes a voltage signal reference to the secondary coil of the transformer 180. When the voltage signal reference impressed upon the secondary of the transformer 180 plus the voltage signal impressed upon the secondary of the trans-former due to the input signal impressed upon the primary of said transformer drives the cathode of the diode 103 sufficiently negative, the diode 103 will cause the pulse circuit 104 to provide an input to the count rate circuit 106. The count rate circuit 106 will count each such input. Thus, the count rate circuit 106 will only count the number of electromagnetic signals received by the system depicted in FIG. 6 which exceed a predetermined amplitude. This predetermined amplitude is always some constant K times the average peak amplitude of the voltage $\bar{E}$ appearing across the secondary of transformer 180. K is the turns ratio of the primary coil to the secondary coil of the transformer 180. Thus, it will be seen that the pulse counter of FIG. 6 is self-adjustable. That is, it will only provide a countable signal for the count rate circuit 106, for each signal it receives which is greater than a predetermined portion of the average peak amplitudes of the signals it has already received previously.

The operation of the pulse counter shown in FIG. 6 may be more readily understood by use of the graphs shown in FIGS. 7 and 8. When no signal is received by the pulse counter shown in FIG. 6, the voltage at the cathode of the diode 103 will be plus 24 volts as shown by numerals 108 and 110. This is due to the action of the unclamper circuit 176 which holds the base of the transistor 194 at +24 volts except during receipt of a signal. Upon receipt of a signal having a positive magnitude from a gate like gate 24 or 44 of FIG. 1, the voltage reference of the transformer secondary due to the unclamping signal applied through diode 198 to the base of transistor 194 will drop to a value such as that indicated by dotted line 112 which is the same as the voltage on capacitor 192. The voltage on the capacitor 192 is dependent upon the average peak voltages of the signals it has received and is used to set the window count rate threshold of the pulse counter of FIG. 6. Note the unclamping voltage descends to zero from +24 volts. Simultaneously with this occurrence, the input signal causes, through the primary coil of the transformer 180, an additional negative signal across the secondary of the transformer 180 as shown by numeral 114 in FIG. 8. When this additional negative signal is negative enough such as depicted by numeral 116 of FIG. 7, the diode 103 will be activated and cause an input to the count rate circuit 106. If the additional signal provided by the primary coil of the transformer 180 across the secondary of the coil of the transformer 180 is not large enough, such as depicted by numeral 118 of FIG. 7, then the diode 103 will not be activated.

Thus, it will be seen that unless a signal received from a gate like gate 24 or 44 is larger than a predetermined magnitude, the diode 103 will not provide a signal to the pulser circuit 104 which can be counted. Since the output coupling of the secondary coil of the transformer 180 is dependent upon both the magnitude of the signal from a gate like gate 24 or 44 plus the magnitude of the output of the transistor 194, it will be seen that the pulse counter shown in FIG. 6 can be used to count only electromagnetic signals greater than a predetermined magnitude which magnitude is based on a predetermined portion of the electromagnetic input signals. One advantage of the pulse counter shown in FIG. 6 is that no discharging of the capacitor 192 occurs due to signal processing.

Thus, it will be seen that pulse counters like that shown in FIG. 6 when counting the signals received from the same storm will provide identical count rates which are indicative of the number of electromagnetic signals provided by such storm which signals are larger than a predetermined magnitude. Since this predetermined magnitude is solely dependent upon the average peak amplitude distribution of the storm being received by the detector associated with the pulse counter, each pulse counter will provide an indication of all electromagnetic signals in the amplitude spectrum of the storm which are greater than a predetermined magnitude which indication is not affected by the distance between said storm and said detector. That is, for the same storm, two or more pulse counters in a triangulation network, will provide identical counting rates at the several counters.

To minimize the complexity of the drawings, only two direction finder systems have been described and shown for analyzing signals having specific lines of direction. It is believed readily understandable that for analyzing signals having various lines of direction that (1) the pickup coils of the two direction finder systems can be rotated about a vertical axis, and/or (2) that additional direction finder antennas and associated detector circuits, as described, can be added by merely adding additional direction finders and detector circuits therefor to the direction finders detector circuits shown in FIG. 1.

In accordance with the foregoing description, a triangulation network may be established by placing a detecting unit at each of two locations A and B, which are a known distance apart. Each detecting unit may, for example, be adapted to detect electromagnetic signals transmitted to its location along various lines of direction by being provided with a plurality of direction finder antennas (such as the directional pickup coils 10 and 30) and associated detector circuits, as described above, wherein each direction finder antenna is receptive to signals transmitted along a given line of direction.

In the operation of such a triangulation network to locate a given storm condition or storm conditions which are producing electromagnetic signals, the signals will be transmitted by each storm condition along a different line of direction (such as first and second lines of direction) to the units placed at locations A and B. The pickup coils 10 and 30 of direction finder antennas which are directed along such lines of direction for reception of signals from such lines of direction, will detect the signals. The signals will then be passed to the circuitry (FIGS. 1 and 2) associated with the coils 10 and 30, so that for each signal transmitted along a different line of direction, a detector at location A will cause the average peak amplitude of the signal received to appear across a resistor corresponding to the resistor 66 (FIG. 2). Thus a first detector at location A may produce a first average peak amplitude and a second detector at location B will produce a second average peak amplitude.

The electromagnetic signals from the storm which are detected by the various detectors at locations A and B will then be compared to a given proportion of the respective first and second average peak amplitudes by a circuit in each unit corresponding to the circuit shown in FIG. 2. Count rate circuits in each unit similar to the count rate circuit 106 will then determine the rate of occurrence of only the compared signals arriving at locations A and B which exceed the given proportion of the respective average peak amplitudes.

As stated above, two or more pulse counters in a triangulation network will provide identical counting rates when they detect the same storm. Thus, because the same storm condition or storm conditions are being detected along the various directions, such as the first and second directions, the count rates determined by the circuits 106 for each storm condition, will be the same.

Thus, by comparing these count rates produced from the various lines of direction, and noting the angular bearing of the direction finder antennas at locations A and B which received such signals having identical count rates, the location of the given storm condition or storm conditions, may be computed by the triangulation method by determining the intersection of the angular bearings of the antennas at locations A and B which received the signals having the identical count rates.

In view of the principles set forth herein, I have shown some of the ways of carrying out the present invention and some of the equivalents which are suggested by these disclosures.

Now therefore I claim:
1. The method of monitoring a weather condition independently of variation in the range of said weather condition from a detecting location, said weather condition producing electromagnetic signals having a characteristic amplitude distribution pattern, wherein the amplitudes of said electromagnetic signals that form said distribution pattern vary with the range of said weather condition, which comprises:
   determining the average peak amplitude of said electromagnetic signals produced by said weather condition, and
   counting only those of said electromagnetic signals produced by said weather condition which have an amplitude exceeding a selected portion of said average peak amplitude to render the monitoring of said weather condition independent of the range of said weather condition.

2. The method of detecting a weather condition which produces electromagnetic signals having a first characteristic amplitude distribution pattern, the amplitude of the electromagnetic signals having said characteristic pattern varying with the range of said weather condition, which comprises:
   directionally sensing said electromagnetic signals produced by a weather condition;
   determining the average peak amplitude of said detected electromagnetic signals, said average peak amplitude varying with the range of said weather condition; and
   counting only said detected electromagnetic signals which exceed a selected portion of said average peak amplitude to render the detection of said weather condition independent of the range of said weather condition.

3. The method of monitoring a moving weather condition independently of the range of said weather condition from a weather detecting location, said weather condition producing a series of electromagnetic signals having a characteristic amplitude distribution pattern which varies with changes in said weather condition, the amplitude of said electromagnetic signals varying with said range of said weather condition, which comprises:
   determining a first average peak amplitude of said electromagnetic signals produced by said moving weather condition positioned in a given location relative to said detecting location,
   counting only those of said electromagnetic signals produced by said moving weather condition in said given location which have an amplitude exceeding a selected proportion of said first average peak amplitude,
   changing said first average peak amplitude to a second average peak amplitude in response to electromagnetic signals produced by said moving weather condition upon movement thereof to a location different from said given location, and
   counting only those of said electromagnetic signals produced by said weather condition in said different location which have an amplitude exceeding said selected proportion of said second average peak amplitude.

4. The method of monitoring a moving weather condition independently of the range of said weather condition from a weather detecting location, siad weather condition producing a series of electromagnetic signals having a characteristic amplitude distribution pattern which varies with changes in said weather condition, the amplitude of said electromagnetic signals varying with said range of said weather condition, which comprises:
   determining a first average peak amplitude of said electromagnetic signals produced by said moving weather condition positioned in a given location relative to said detecting location, determining a first rate of production of only those of said electromagnetic signals produced by said moving weather condition in said given location which have an amplitude exceeding a selected proportion of said first average peak amplitude, changing said first average peak amplitude to a second average peak amplitude in response to electromagnetic signals produced by said moving weather condition upon movement thereof to a location different from said given location, and determining a second rate of production of only those of said electromagnetic signals produced by said weather condition in said different location which have an amplitude exceeding said selected proportion of said second average peak amplitude to render said monitoring of said weather condition independent of said movement of said weather condition.

5. The method of monitoring moving and changing weather conditions independently of the range of said weather conditions from a weather detecting location, first and second of said weather conditions each producing a series of electromagnetic signals having a characteristic amplitude distribution pattern which varies with changes in said weather condition, the amplitude of said electromagnetic signals varying with the range of the weather condition which produced said signals, which comprises:

determining a first average peak amplitude of said electromagnetic signals produced by said first weather condition positioned in a given location relative to said detecting location, said first average peak amplitude varying as said first weather condition changes to said second weather condition;

determining a first rate of production of only those of said electromagnetic signals produced by said first and second weather conditions in said given location which have an amplitude exceeding a selected proportion of said first average peak amplitude;

changing said first average peak amplitude to a second average peak amplitude in response to electromagnetic signals produced by said first and second weather conditions upon movement thereof to a location different from said given location; and determining a second rate of production of only those of said electromagnetic signals produced by said first and second weather conditions in said different location which have an amplitude exceeding said selected proportion of said second average peak amplitude so that said second rate varies independently of said movement of said weather conditions and varies only upon said change from said first weather condition to said second weather condition.

6. The method of detecting changing weather wherein said weather changes from a first weather condition which produces electromagnetic signals having a characteristic amplitude distribution pattern to a second weather condition which produces electromagnetic signals having said characteristic amplitude distribution pattern, the amplitude of the electromagnetic signals having said amplitude distribution pattern varying with both the change and the range of the weather condition, which comprises:

monitoring the average peak amplitude of electromagnetic signals produced by said first and second weather conditions, said average peak amplitude varying with both the change and the range of said weather condition;

comparing electromagnetic signals received from said first and second weather conditions to a selected portion of the average peak amplitude monitored at the time of receipt of each of said signals to render the detection of said changing weather independent of said range of said weather condition;

counting only those of said compared electromagnetic signals which have an amplitude which exceeds said selected portion to establish a count rate indicative of one of said first and second weather conditions and independent of said range of said weather condition, and monitoring the count rate to detect changes therein indicative of said changing weather.

7. The method of ascertaining the location of a storm condition, wherein a storm condition produces electromagnetic signals which have a characteristic amplitude distribution pattern, the amplitude of said electromagnetic signals varying with the range of the storm condition producing said signals, which comprises:

detecting electromagnetic signals produced by a storm condition and arriving at a first location from a first direction, detecting electromagnetic signals produced by a storm condition and arriving at a second location from a second direction, determining a first average peak amplitude of said electromagnetic signals arriving at said first location, determining a second average peak amplitude of said electromagnetic signals arriving at said second location, comparing each electromagnetic signal arriving at said first location from said first direction to a given proportion of said first average peak amplitude at the time of said arrival of each said signal, comparing each electromagnetic signal arriving at said second location from said second direction to said given proportion of said second average peak amplitude at the time of said arrival of each said signal, determining the rate of occurrence of only said compared signals arriving at said first location which exceed said given proportion of said first average peak amplitude, determining the rate of occurrence of only said compared signals arriving at said second location which exceed said given proportion of said second average peak amplitude, and comparing said determined rates of occurrence for said electromagnetic signals arriving at said first and second locations to indicate the location of said storm condition.

8. The method of ascertaining the location of a storm condition, wherein a storm condition produces electromagnetic signals which have a characteristic amplitude distribution pattern, the amplitude of said electromagnetic signals varying with the range of the storm condition producing said signals, which comprises:

detecting electromagnetic signals produced by a storm condition and arriving at a first location from a first direction, detecting electromagnetic signals produced by a storm condition and arriving at a second location from a second direction, determining a first average peak amplitude of said electromagnetic signals arriving at said first location, determining a second average peak amplitude of said electromagnetic signals arriving at said second location, comparing each electromagnetic signal arriving at said first location from said first direction to a given proportion of first average peak amplitude of said signals at the time of arrival of each said signal, comparing each electromagnetic signal arriving at said second location from said second direction to a given proportion of the second average peak amplitude of said signals at the time of arrival of each said signal, determining the rate of occurrence of only said compared signals arriving at said first location which exceed said given proportion of said first average amplitude, determining the rate of occurrence of only said compared signals arriving at said second location which exceed said given proportion of said second average peak amplitude, and selecting the intersection of those directions from which signals having equal count rates arrive to determine the location of the storm condition.

9. The method of ascertaining the location of different weather conditions when said different weather conditions are at different locations, wherein each weather condition produces electromagnetic signals which have an amplitude distribution pattern characteristic of the particular weather condition, the amplitude of said electromagnetic signals varying with the range of the weather condition, which comprises:

detecting at a first location electromagnetic signals produced by said different weather conditions and arriving from a plurality of directions, detecting at a second location electromagnetic signals produced by said different weather conditions and arriving from a plurality of directions, determining for each of said directions the average peak amplitude of said electromagnetic signals arriving at said first location and at said second location, comparing an electromagnetic signal arriving at said first location from each one of said plurality of directions to a given proportion of the average peak amplitude of said signals received from the corresponding one of said directions, comparing an electromagnetic signal arriving at said second location from each one of said plurality of directions to said given proportion of the average peak amplitude of said signals received from the correponding one of said directions, determining the rate of occurrence of only those of said compared signals arriving at said first location which exceed said given proportion of their corresponding said average peak amplitude, selecting a direction at one of said first and second locations having the same rate of occurrence as a direction at the other of said first and second locations, and determining the intersection of said selected directions to locate each of said different weather conditions.

10. Apparatus for detecting a moving weather condition independently of movement of said weather condition, said weather condition being effective to produce electromagnetic signals having a characteristic amplitude distribution pattern, the amplitude of the electromagnetic signals having said amplitude distribution pattern varying with the range of the weather condition, which comprises:

a directional detector responsive to said electromagnetic signals from said weather condition moving along a given direction for generating pulses indicative of said signals;

a capacitor connected to said detector, said capacitor being charge to the average peak amplitude of said pulses to indicate the average peak amplitude of said signals;

resistor means rendered effective upon a decrease in the amplitude of said electromagnetic signals for reducing the charge on said capacitor to a value indicative of the decreased average peak amplitude of said signals;

a transformer having a secondary coil and a primary coil connected to said detector for applying said pulses to said secondary coil, said coils having a selected turns ratio so that a selected multiple of said pulses is applied to said secondary coil to render the detection of said weather condition independent of said movement;

gate means responsive to said pulses for applying a potential to said secondary coil according to the charge on said capacitor;

said secondary coil being effective to produce an output pulse when said selected multiple of said pulses exceeds said applied potential; and counting means responsive to each output pulse for indicating a selected portion of the character amplitude pattern to detect said weather condition.

11. Apparatus for detecting a weather condition wherein said weather condition produces electromagnetic signals having a characteristic amplitude distribution pattern, the amplitude of the electromagnetic signals having said amplitude distribution pattern varying with the range of the weather condition, which comprises:

means responsive to said electromagnetic signals from a selected direction for producing pulses indicative of said signals;

capacitor means responsive to said pulses for storing a charge indicative of the average peak amplitude of said pulses;

means rendered effective by a change in the range of said storm along said selected direction for modifying said charge according to said change of said range;

transformer means having a primary coil and a secondary coil, said coils having a given turns ratio, said primary coil being connected to said pulse producing means so that each of said pulses applied to said primary coil appears in secondary coil as a pulse having an amplitude proportional to said turns ratio;

means rendered effective by a selected one of said pulses for applying a potential proportional to said charge on said capacitor means at the time of said selected pulse across said secondary coil of said transformer means;

said secondary coil being effective to develop an output signal each time said proportional pulse exceeds said applied potential; and means for measuring the rate of development of said output signals to detect said weather condition.

References Cited by the Examiner

UNITED STATES PATENTS

| | | | |
|---|---|---|---|
| 2,586,091 | 2/1952 | Rinia | 328—115 |
| 2,870,328 | 1/1959 | Pomeroy | 328—115 |
| 2,946,020 | 7/1960 | Hudson | 328—115 |
| 2,953,020 | 9/1960 | Hunt. | |

OTHER REFERENCES

Chapman et al.: Nature, vol. 177, No. 4516, May 19, 1956, pp. 930–933.

CHESTER L. JUSTUS, *Primary Examiner.*

GEORGE N. WESTBY, LEWIS H. MYERS, *Examiners.*

J. ZAZWORSKY, R. E. BERGER, *Assistant Examiners.*